United States Patent [19]
Risner et al.

[11] Patent Number: 5,943,401
[45] Date of Patent: Aug. 24, 1999

[54] ELECTRONIC FORMS VOICE MESSAGING APPARATUS AND METHOD

[75] Inventors: David A. Risner, Duvall, Wash.; Michael L. Flanary, Suwanee, Ga.

[73] Assignee: NCR Corporation, Dayton, Ohio

[21] Appl. No.: 08/778,473

[22] Filed: Jan. 3, 1997

[51] Int. Cl.$^6$ .................................................. H04M 1/64
[52] U.S. Cl. ...................................... 379/88.22; 379/88.23
[58] Field of Search ........................... 379/67, 88, 89, 379/90.01, 93.01, 93.09, 71, 76, 88.16, 88.22, 88.23, 88.25; 329/201; 704/270

[56] References Cited

U.S. PATENT DOCUMENTS

| | | | |
|---|---|---|---|
| 4,943,995 | 7/1990 | Daudelin et al. | 379/67 |
| 4,982,420 | 1/1991 | Theis | 379/68 |
| 5,185,781 | 2/1993 | Dowden et al. | 379/67 |
| 5,243,643 | 9/1993 | Sattar et al. | 379/88 |
| 5,247,568 | 9/1993 | Bergsman et al. | 379/67 |
| 5,345,501 | 9/1994 | Shelton | 379/89 |
| 5,367,609 | 11/1994 | Hopper et al. | 395/2.87 |
| 5,396,542 | 3/1995 | Alger et al. | 379/67 |
| 5,434,908 | 7/1995 | Klein | 379/88 |
| 5,434,910 | 7/1995 | Johnson et al. | 379/89 |
| 5,444,774 | 8/1995 | Friedes | 379/266 |
| 5,539,808 | 7/1996 | Inniss et al. | 379/67 |
| 5,568,540 | 10/1996 | Greco et al. | 379/89 |
| 5,671,269 | 9/1997 | Egan et al. | 379/88 |

Primary Examiner—Scott Weaver
Attorney, Agent, or Firm—Steven J. Adamson

[57] ABSTRACT

Apparatus and method for electronic form voice messaging. Logic is provided for generating a plurality of user specified outgoing and playback message components. Incoming message components that are responsive to the outgoing message components are combined in a user defined manner with the playback message components to form an output playback message. A user may specify a plurality of playback formats. Computer based and answering machine based embodiments are disclosed. A graphic user interface is taught in conjunction with the computer based implementation.

17 Claims, 2 Drawing Sheets

5,943,401

ELECTRONIC FORMS VOICE MESSAGING APPARATUS AND METHOD

FIELD OF THE INVENTION

The present invention relates to electronic forms voice messaging and more specifically to enhanced customization and more efficient message processing in electronic forms voice messaging systems.

BACKGROUND OF THE INVENTION

Current voice mail systems commonly used in home and office settings frequently provide an outgoing message and record a single string of audio input data. This audio data string is usually recorded on an electronic or magnetic media. A date stamp and/or caller identification information may be appended to the audio data string. In contrast to a message taken by a human who may ask questions such as "Who is calling? What is your number? What is the call regarding? When is the best time to reach you?", etc., a message left on a conventional machine may leave out important information, including answers to the above questions or other information.

Machines do exist that prompt an incoming caller for name, address, and related information, for example, for receiving product literature and the like. A disadvantage of these machines is that they are generally expensive and undesirably complicated to program and not user friendly during message playback.

SUMMARY OF THE INVENTION

Accordingly, it is an object of the present invention to provide a voice messaging apparatus and method that permits a user to readily customize the format of outgoing and incoming messages.

It is another object of the present invention to provide a voice messaging apparatus and method that efficiently processes incoming voice message components.

It is another object of the present invention to provide a voice messaging apparatus and method that provides playback format options.

These and related objects of the present invention are achieved by the electronic forms voice messaging apparatus and method disclosed herein.

In one embodiment of the present invention a voice messaging apparatus is provided that comprises means for storing a plurality of discrete outgoing message components; means, responsive to an incoming call, for serially broadcasting said plurality of stored outgoing message components; means for recording an incoming message component after a plurality of said outgoing voice message components; and means for selecting an order in which said incoming message components are output from said recording means during playback. This apparatus may further comprise means for storing a plurality of playback message components and combining said incoming message components and said playback message components in a predefined manner to produce an output playback message; means for creating an identifier for each of said incoming message components; means for creating a graphic user interface including an icon indicative of said message components; and means for prerecording a plurality of different groups of outgoing message components. The order selecting means may further include means for selecting a plurality of playback formats which include different groups of the incoming message components.

In another embodiment, the present invention provides a voice messaging apparatus comprising means for storing a plurality of discrete outgoing message components; means, responsive to an incoming call, for serially broadcasting said plurality of stored outgoing message components; means for recording an incoming message component after a plurality of said outgoing message components; means for storing a plurality of playback message components; and means for combining said incoming message components and said playback message components in a predefined manner to produce an output playback message. This apparatus may also include means for selecting a plurality of playback formats which include different groups of said incoming message components; means for creating an identifier for each of said incoming message components; means for creating a graphic user interface including an icon indicative of said message components; and means for prerecording a plurality of different groups of outgoing message components.

Yet another embodiment of the present invention includes a method for achieving electronic forms voice messaging as discussed herein and claimed below.

The attainment of the foregoing and related advantages, features and configurations of the present invention should be more readily apparent to those skilled in the art, after review of the following more detailed description of the invention taken together with the drawings.

DETAILED DESCRIPTION OF PREFERRED EMBODIMENT

Figure 1:
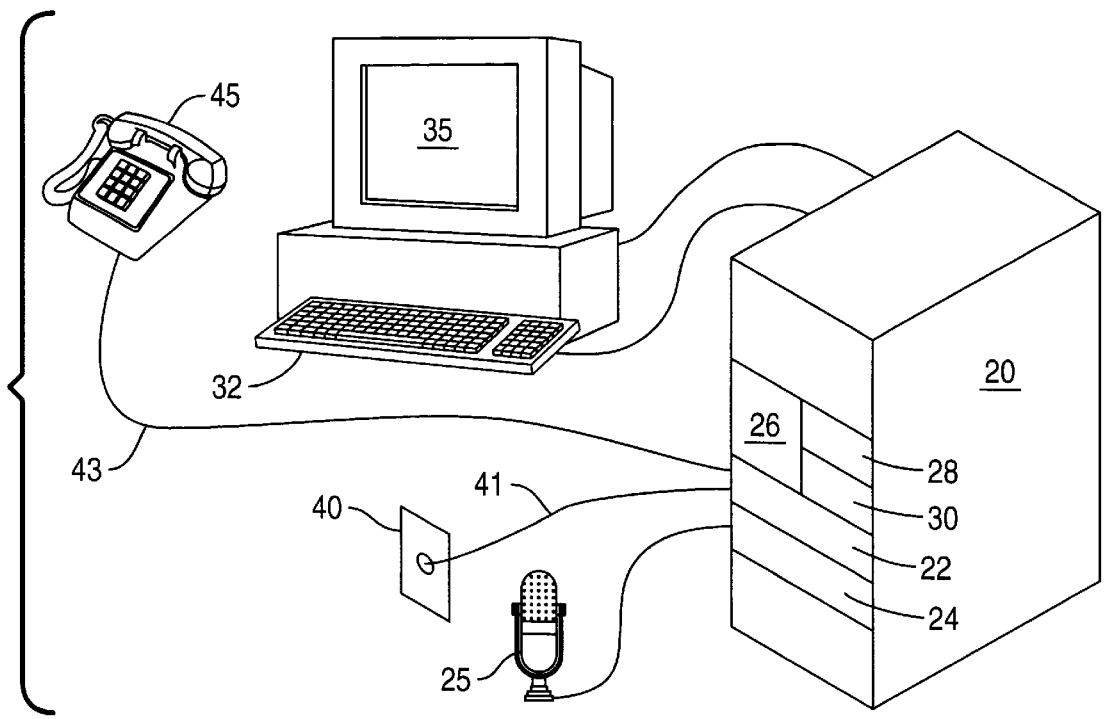
FIG. 1 is a diagram of a computer based electronic forms voice messaging system in accordance with the present invention.

Referring to FIG. 1, a diagram of a computer based voice message system 10 in accordance with the present invention is shown. This system includes a conventional desktop computer or like computing device 20 having a modem 22, a sound card 24 with microphone 25, a processor 26, fast access memory 28 and disk memory 30. A keyboard 32, monitor 35 and other conventional hardware and software components are also provided. Telephone line 41 connects wall jack 40 to the modem, while telephone line 43 connects telephone 45 to the modem.

In an known manner modem 22 responds to an incoming call on line 41. Modem 22 is configurable to answer the call after a predefined number of rings and preferably distinguishes between incoming voice and fax data. If the incoming signal is voice data, modem 22 sends an interrupt to processor 26 which retrieves voice message processing software from disk memory 30 into fast access memory 28.

The voice message processing software includes a plurality of previously recorded electrically stored outgoing message components. These components prompt a caller for specific information and each prompted response is processed as an incoming message component. The software also contains a plurality of previously recorded playback message components. The playback message components are integrated with the incoming message components in a predefined manner as described in more detail below to form a playback message.

Figure 2:
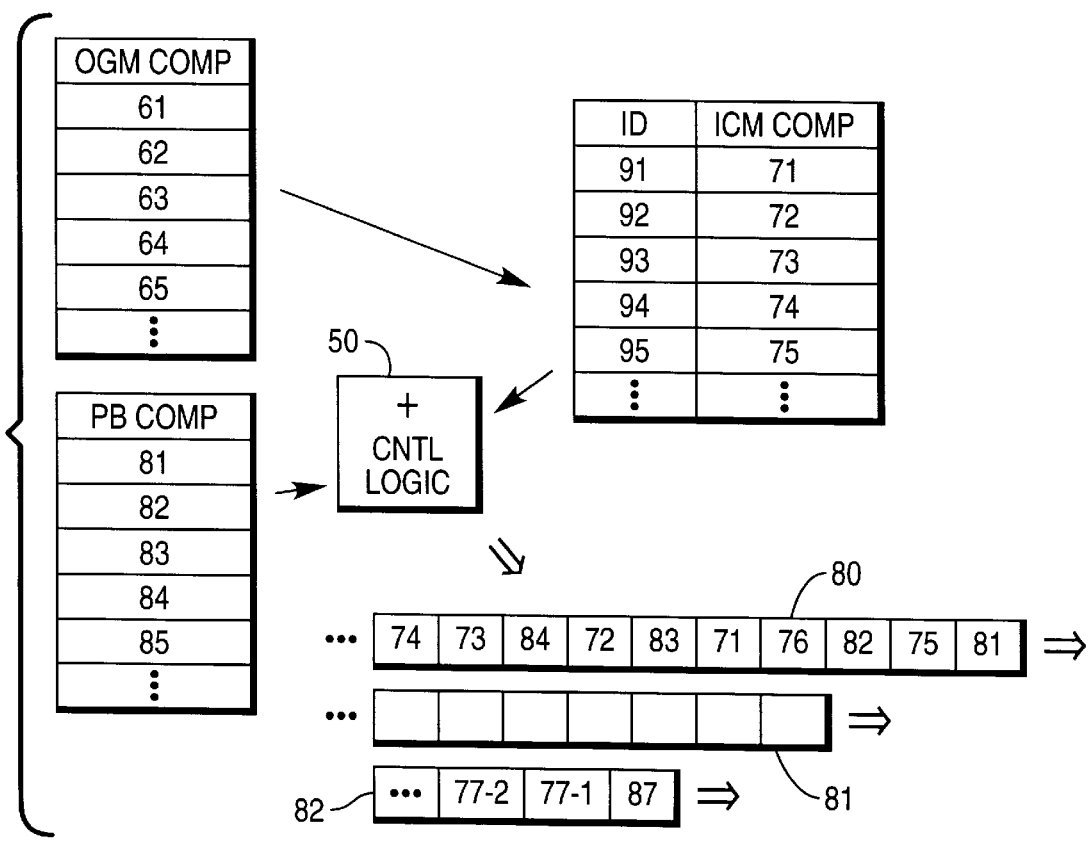
FIG. 2 is a diagram illustrating the arrangement of voice message components in accordance with the present invention.

Referring to FIG. 2, a diagram illustrating the arrangement of various voice message components in accordance with the present invention is shown. In constructing an outgoing message a user specifies a plurality of outgoing message components 61–65 and defines identifiers 91–95 of a plurality of responsive incoming message components 71–75. The user also specifies a plurality of playback message components 81–85 and the order in which the incoming message components are combined with the playback message components in an output playback message. Once created (by conventional programming techniques), these components are stored in disk memory 30 and are called into system memory 28 as required. It should be recognized that while five message components are illustrated for each message group, the number of components in any group is preferably adjustable by a user.

Message components are preferably configured through a graphic user interface created on monitor 35 as discussed in more detail below (see FIG. 3). Preferably through this interface, a user is prompted to record a first outgoing message component 61 to which the user may enter an string such as "Hello, this is NAME. I am not available now, but may I ask who is calling?". This outgoing message component may be entered through microphone 25, the handset of telephone 45, or as text entered on the monitor if text to voice conversion is supported. After the user has completed first outgoing component 61, the user is prompted to define an identifier 91 of a first incoming message component 71. The content of component 71 will be responsive to the inquiry of outgoing message component 61. Identifier 91 preferably points to a location in memory where the first incoming message component is stored. The incoming voice message component is preferably terminated by a predefined period of silence (2–4 seconds) or the depression of a specified key by the caller. The former is preferred to more closely approximate human conversation.

The user is then prompted to record a second outgoing message component 62 to which the user may respond with "What is your number?". Identifier 92 is defined to point to the second incoming message component 72 which will hold the response to the second outgoing message component 62.

This process of recording outgoing message components and defining identifiers for responsive incoming message components in continued until an outgoing message containing sufficient content (as determined by a user) and the appropriate incoming message component identifiers are developed. It should be recognized that the user preferably specifies whether an incoming message component is generated. Hence the last outgoing message component may say "Good-bye" after which no incoming message component will be recorded.

A user next generates the playback message components, if any, and designates the order in which the incoming message components 71–75 are integrated into the playback message components 81–85, to create an output playback message 80. For example, the complete output playback message may be as follows "At 1:31pm on Dec. 3, Jody Hicks called to say 'I need to borrow your car this weekend'. This person can be reached at 754-5555 anytime after 8pm." In this example, outgoing message components 61–64 might be, respectively, "Who is calling?", "What is the message?", "What is your number", and "When is the best time to reach you at this number?". The incoming message components 71–74 are, respectively, "Jody Hicks", "I need to borrow your car this weekend", "754-5555" and "anytime after 8pm", while incoming components 75 and 76 are the time and date stamp provided by an internal clock in computer 20. The playback message components 81–84 would be "At", "on", "called to say" and "This person can be reached at". Thus, the order of the output playback message components are 81,75,82,76,71,83,72,84,73,74.

Box 50 represents control logic for assembling the incoming message components and playback message components into an output playback message 80. Logic 50 includes a processor and other conventional processing logic and for achieving the above described features. Software techniques for identifying incoming message components and combining incoming and playback components in a desired manner are within the knowledge of one skilled in the art given the teachings herein.

It should be recognized that the above described format can be modified to ask for other information such as a work or home phone number, a fax number, and/or an e-mail address. Furthermore, the system can also be configured to ask for information more than once. Sets of message components can also be stored such the a user may select "on vacation", "out of the office on work", "out of the office—sick" or the like predefined sets of message components. It should also be recognized that as voice recognition capabilities improve, branches to additional sets of message components including those that permit meeting scheduling, merchandise selecting, and information gathering, etc., may be included. Without voice recognition such branches could be selected by the depression of a telephone key by a user in response to an appropriate prompt.

The system of the present invention also preferably includes creation of different playback options. For example, the user can establish three user defined playback options. A first option (represented by output playback message 82) may be for rapid message screening, such as when the user is calling from an airport on business travel to check messages. This option may provide a single playback message component 87 such as "The following people called" to which the name incoming message component 77 for all incoming calls (77-1, 77-2, . . . ) are concatenated. Upon hearing a desired name, the user can depress a predefined key pad which causes a fuller playback option to commence for that particular call. A second option (represented by output playback message 81) may playback, for example, name, number and message. A third option (represented by output playback message 80) may playback all recorded incoming information (i.e., full format) for all incoming calls. These functions are performed by logic 50 using known programming techniques.

Figure 3:
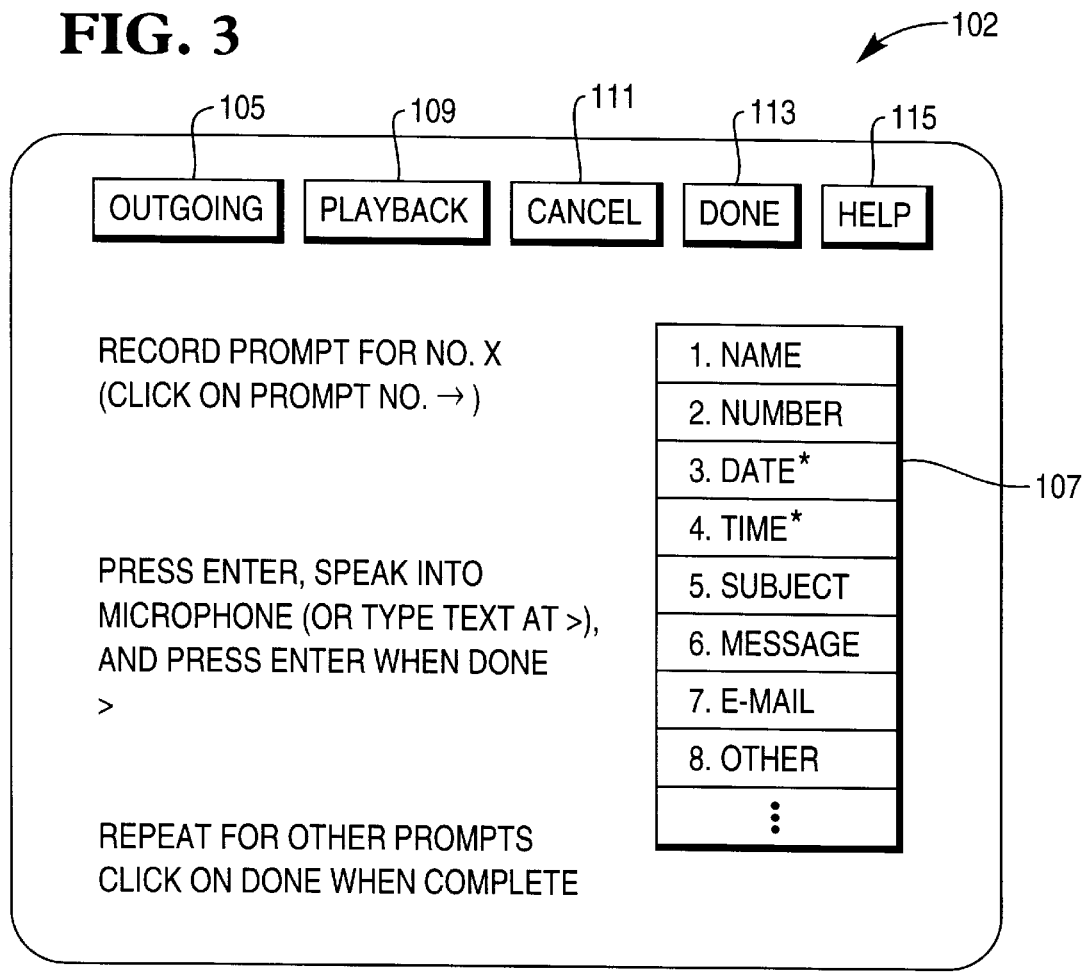
FIG. 3 is a representative display of a graphic user interface for message component formation in accordance with the present invention.

Referring to FIG. 3, a representative display of a graphic user interface (GUI) 102 for message component formation in accordance with the present invention is shown.

In a preferred embodiment, a user clicks on an outgoing message icon 105 and responds to text commands displayed on monitor 35 to encode the outgoing message components 61–65. An incoming message component list icon 107 provides a list of incoming message identifiers. A user can preferably define a name to give to each identifier that is an indication of the expected content of the corresponding incoming message component. An identifier in the list is selected by clicking on the appropriate box, i.e., 1,2,3, etc.

Playback icon 109 is provided to initiate both generation of the playback message components and integration of the incoming and playback components to create an output playback message (in one or more formats). These features may be implemented responding to text commands and/or clicking on representative icons in a desired sequence, amongst other manners.

Cancel, Done and Help icons 111,113,115 are also preferably provided to initiate execution of these features. It should be noted that although a particular graphic user interface arrangement is shown in FIG. 3, a wide variety of graphic user interfaces or other types of interfaces may be utilized. Software programming techniques for development of graphic user interfaces are generally known in the art. The software programs are run on processor 26 (or logic 50)

Figure 4:
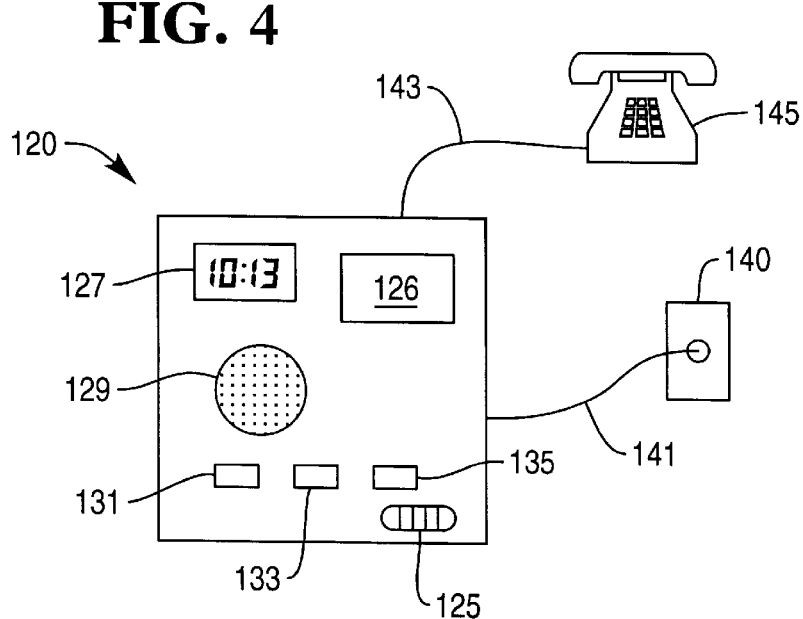
FIG. 4 is a diagram of a telephone answering machine incorporating an electronic forms voice messaging system in accordance with the present invention

Referring to FIG. 4, a telephone answering machine 120 incorporating an electronic forms voice messaging system in accordance with the present invention is shown. Answering machine 120 preferably includes a processor 126, memory, an internal clock 127, a speaker 129, a microphone 125 and a plurality of control buttons 131,133,135. Telephone line 141 connects machine 120 to wall jack 140 and telephone line 143 connects machine 120 to telephone 145.

Software which operates similarly to that described above executes on processor 120. A user selects a predefined one of buttons 131,133,135 to begin recording outgoing message components. The outgoing message components may be entered via microphone 125 or the telephone headset. Entry by the handset eliminates the inclusion of microphone 125. Each outgoing message component may be terminated by a predefined period of silence or by depression of a corresponding one of said buttons. Double depression (i.e., double clicking) an appropriate button preferably creates an identifier for a responsive incoming message component. Since a name for the expected content of the corresponding component is not displayed as in FIG. 3 above, a user will have to note the order number and expected content of the incoming message components.

Another of buttons 131,133,135 is depressed to initiate recording of the playback message components. These components are recorded in the same manner as the outgoing message components. The order of incoming and playback message components is preferably achieved by sequentially selecting the number corresponding to a particular incoming or playback component from the telephone keypad, in response to appropriate prompts. Generation of the necessary prompts and implementation of the features discussed above is achieved by control logic in machine 120. This logic includes processor 126 and software as described above (except that a similar graphic user interface is not created).

It should be recognized that while buttons 131,133,135 are illustrated there are many different ways in which an interface can be provided between a user and answering machine 120 to program the desired functions. These include the use of fewer or more buttons, double or triple depression of buttons, holding buttons down for a predefined period of time, etc. Buttonless interfaces, such as voice activated interfaces are also contemplated and are with the present invention.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A voice messaging apparatus, comprising:

means for storing a plurality of discrete outgoing message components;

means, responsive to an incoming call, for serially broadcasting said plurality of stored outgoing message components;

means for recording an incoming message component after each of said broadcast outgoing message components; and means that permits a user to select an order in which said recorded incoming message components are output from said recording means during incoming message retrieval.

2. The apparatus of claim 1, further comprising:

means for storing a plurality of playback message components; and means for combining said incoming message components and said playback message components in a predefined manner to produce an output playback message.

3. The apparatus of claim 1, wherein said order selecting means comprises means for selecting a plurality of playback formats which include different groups of said incoming message components.

4. The apparatus of claim 1, further comprising logic that creates an identifier for each of said incoming messages.

5. The apparatus of claim 1, further comprising:

logic that creates a graphic user interface including an icon indicative of each of said outgoing message components; and means responsive to designation of at least one of said icons by a user for initiating specification of the content of the one of said outgoing message components that corresponds to the designated icon.

6. The apparatus of claim 1, further comprising: means that permits a user to prerecord a plurality of different groups of outgoing message components.

7. A voice messaging apparatus, comprising:

means for storing a plurality of discrete outgoing message components;

means, responsive to an incoming call, for serially broadcasting each of said plurality of stored outgoing message components;

means for recording an incoming message component after each of said broadcast outgoing message components;

means for storing a plurality of playback message components; and means for combining said incoming message components and said playback message components in a user specified manner to produce an output playback message.

8. The apparatus of claim 7, wherein said combining means comprises means for selecting a plurality of playback formats which include different groups of said incoming message components.

9. The apparatus of claim 7, further comprising logic that creates an identifier for each of said incoming components.

10. The apparatus of claim 7, further comprising:

logic that creates a graphic user interface including an icon indicative of each of said outgoing message components; and means responsive to designation of at least one of said icons by a user for initiating specification of the content of the one of said outgoing message components that corresponds to the designated icon.

11. The apparatus of claim 7, further comprising:

means that permits a user to prerecord a plurality of different groups of outgoing message components.

12. A method of voice message processing, comprising the steps of:

storing a plurality of discrete outgoing message components;

serially broadcasting said plurality of stored outgoing message components in response to an incoming call;

recording an incoming message component after each of said broadcast outgoing message components; and causing said incoming message components to be played back in an order specified by a user.

13. The method of claim 12, further comprising the steps of:

storing a plurality of playback message components; and combining said incoming message components and said playback message components in a substantially alternating manner to produce an output playback message.

14. The method of claim 12, wherein said playback ordering step comprises the step of permitting a user to create a plurality of playback formats which each include a different combination of said incoming message components.

15. The method of claim 12, further comprising the step of creating an identifier for each of said incoming message components.

16. The method of claim 12, further comprising the steps of:

creating a graphic user interface including an icon indicative of each of said outgoing message components; and initiating specification of the content of each of said outgoing message components in response to designation of the one of said icons that corresponds to the outgoing message component by a user.

17. The method of claim 12, further comprising the steps of:

permitting a user to prerecord a plurality of different groups of outgoing message components.

* * * * *